(12) United States Patent
Takasaki et al.

(10) Patent No.: US 8,786,895 B2
(45) Date of Patent: Jul. 22, 2014

(54) IMAGE PROCESSING DEVICES AND IMAGE PROCESSING PROCESSES

(75) Inventors: Hironori Takasaki, Ogaki (JP); Taichiro Kimoto, Kyoto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 328 days.

(21) Appl. No.: 13/311,465

(22) Filed: Dec. 5, 2011

(65) Prior Publication Data
US 2012/0140279 A1 Jun. 7, 2012

(30) Foreign Application Priority Data

Dec. 6, 2010 (JP) .................................. 2010-271158

(51) Int. Cl.
*G06K 15/02* (2006.01)
*G06K 15/00* (2006.01)

(52) U.S. Cl.
USPC ............................ 358/1.2; 358/1.18; 358/1.15

(58) Field of Classification Search
None
See application file for complete search history.

(56) References Cited

U.S. PATENT DOCUMENTS

| 7,064,858 B2 * | 6/2006 | Iwai et al. ...................... 358/1.2 |
| 2007/0242089 A1 | 10/2007 | Mukai |
| 2008/0238944 A1 * | 10/2008 | Sugimoto et al. ............. 345/660 |
| 2010/0275157 A1 | 10/2010 | Kano et al. |
| 2012/0026541 A1 | 2/2012 | Kobayashi |

FOREIGN PATENT DOCUMENTS

| JP | 2001-166763 A | 6/2001 |
| JP | 2005-208792 A | 8/2005 |
| JP | 2006-023605 A | 1/2006 |
| JP | 2006-065275 A | 3/2006 |
| JP | 2009-163518 A | 7/2009 |
| JP | 2010-034621 A | 2/2010 |
| JP | 2010-041562 A | 2/2010 |
| JP | 2010-088009 A | 4/2010 |
| JP | 2010-272049 A | 12/2010 |
| JP | 2012-027848 A | 2/2012 |

OTHER PUBLICATIONS

Japan Patent Office, Notice of Reasons for Rejection for Japanese Patent Application No. 2010-271158, mailed Jan. 22, 2013.

\* cited by examiner

*Primary Examiner* — Dov Popovici
(74) *Attorney, Agent, or Firm* — Baker Botts L.L.P.

(57) ABSTRACT

An image processing device that transmits print image data to an image forming portion to form a target image on at least one recording medium, includes a processor and a non-transitory, computer-readable medium storing computer-readable instructions that, when executed by the processor, cause the image processing device to perform steps including: generating display image data at a display scale for displaying the target image including an element of the target image on a display portion prior to formation of the target image on the at least one recording medium; and generating print image data at a print scale for forming the target image on the recording medium, such that the element of the target image to be formed on the at least one recording medium has substantially the same size as the element of the target image displayed on the display portion.

14 Claims, 4 Drawing Sheets

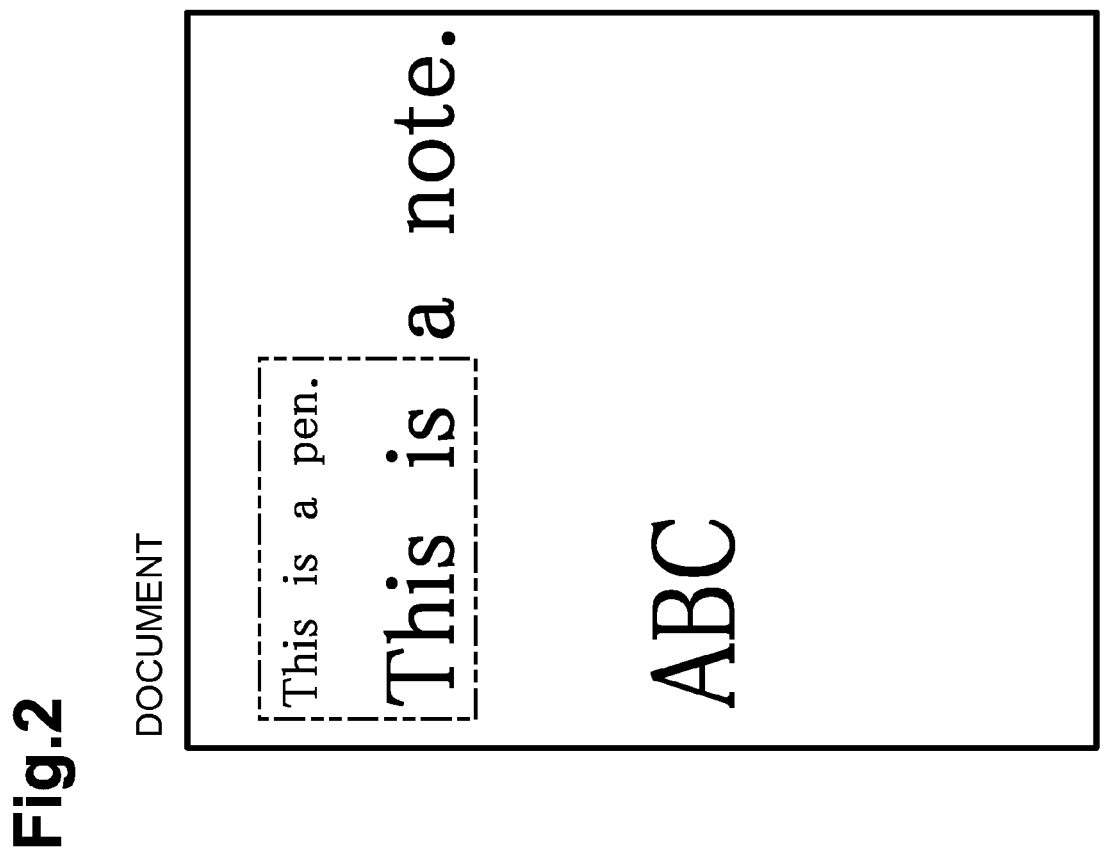

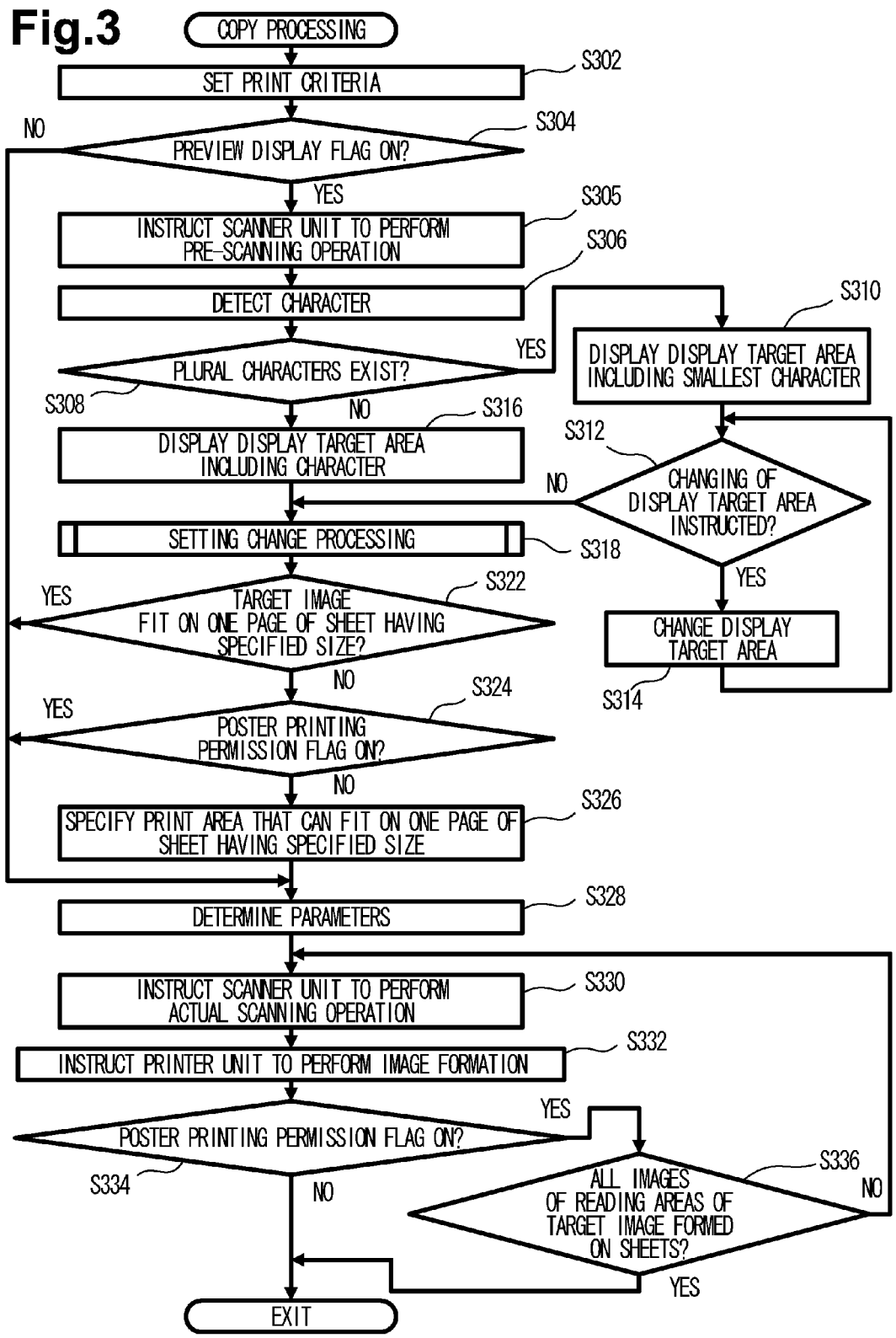

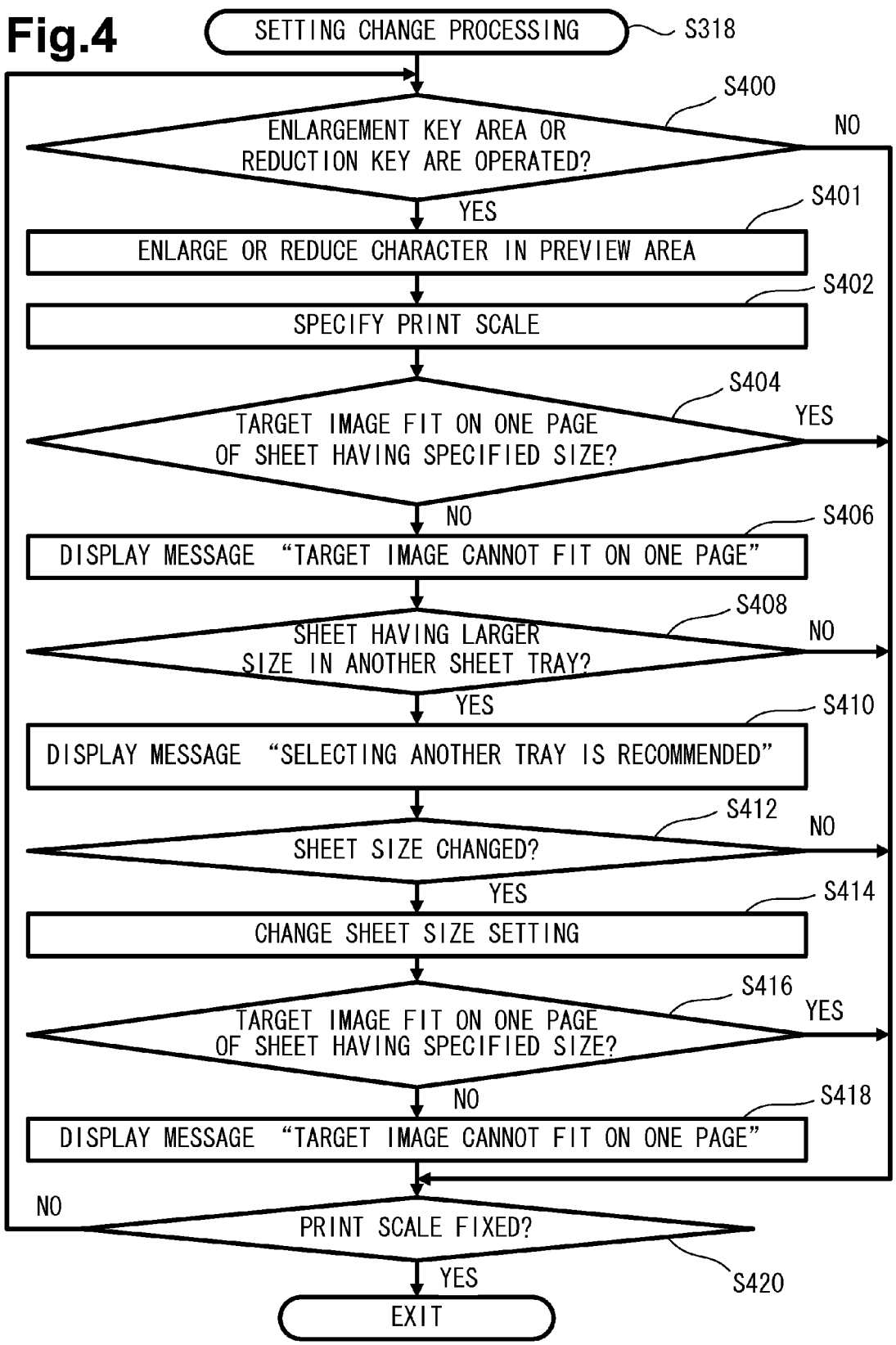

IMAGE PROCESSING DEVICES AND IMAGE PROCESSING PROCESSES

CROSS REFERENCE TO RELATED APPLICATION

This application claims priority from Japanese Patent Application No. 2010-271158, filed on Dec. 6, 2010, the entire disclosure of which is incorporated herein by reference.

BACKGROUND OF THE DISCLOSURE

1. Field of the Disclosure

The invention relates to image processing devices and image processing processes.

2. Description of Related Art

In a known technique, printing is performed by printing print data after enlarging or reducing the print data at a print scale specified by a user. In a known image forming device, a size of characters of a user interface displayed on an operating panel may be changed in accordance with the number of times a change key has been pressed. In the known image forming device, image size of print data is enlarged in accordance with the number of pressing times of the change key, and the enlarged image is printed out.

SUMMARY OF THE DISCLOSURE

Legibility of a print result depends on various factors, including, but not limited to character sizes, font types, and the presence or absence of ornament fonts. An appropriate print scale may not be specified, even though the size of the characters to be printed has been changed in accordance with user input that changes the size of the characters at a user interface displayed on the operating panel.

Therefore, a need has arisen for an image processing device, which overcomes these and other shortcomings of the related art. A technical advantage of the present invention is that a target image may be enlarged or reduced at an appropriate print scale, such that the element of the target image displayed on the a display portion and the element of the target image to be formed on a recording medium may have substantially the same size. The user may confirm visually the size of the element of the target image to be formed on the recording medium prior to the image formation, such that the user may set the appropriate print scale prior to image formation on the recording medium.

According to an embodiment of the present invention, an image processing device that transmits print image data to an image forming portion to form a target image on at least one recording medium, comprising: a processor; and a non-transitory, computer-readable medium storing computer-readable instructions that, when executed by the processor, cause the image processing device to perform steps, comprising: receiving image data for forming the target image on the at least one recording medium; generating display image data from the image data at a display scale for displaying the target image including an element of the target image on a display portion prior to formation of the target image on the at least one recording medium; generating print image data from the image data at a print scale for forming the target image on the recording medium, such that the element of the target image to be formed on the at least one recording medium has substantially the same size as the element of the target image displayed on the display portion; and transmitting the display image data to the display portion.

According to another embodiment of the present invention, a non-transitory, computer-readable medium storing an image processing program that, when executed by a processor, causes an image processing device to execute steps comprising: receiving image data for forming a target image on at least one recording medium; generating display image data from the image data at a display scale for displaying the target image including an element of the target image on a display portion prior to formation of the target image on the at least one recording medium; generating print image data from the image data at a print scale for forming the target image on the recording medium, such that the element of the target image to be formed on the at least one recording medium has substantially the same size as the element of the target image displayed on the display portion; and transmitting the display image data to the display portion.

According to still another embodiment of the present invention, a method for processing image data to from a target image on a recording medium, the method comprising steps of: receiving the image data for forming the target image on the recording medium; generating display image data from the image data based on a display scale for displaying an element of the target image on a display portion prior to the formation of the target image on the recording medium; generating print image data for forming the target image on the recording medium, such that the element to be formed on the recording medium have substantially the same size as the element displayed on the display portion; and transmitting the display image data to the display portion.

Other objects, features, and advantages of an embodiment of the invention will be apparent to persons of ordinary skill in the art from the following description of an embodiment with reference to the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

FIG. 2 is an image depicting a document and a preview window of a multifunction peripheral displaying a target image to be printed on a recording medium according to an embodiment of the invention.

FIG. 3 is a flowchart depicting a copy processing process performed by a multifunction peripheral according to an embodiment of the invention.

FIG. 4 is a flowchart depicting a setting change processing process performed by a multifunction peripheral according to an embodiment of the invention.

DETAILED DESCRIPTION OF EMBODIMENTS

Figure 1:
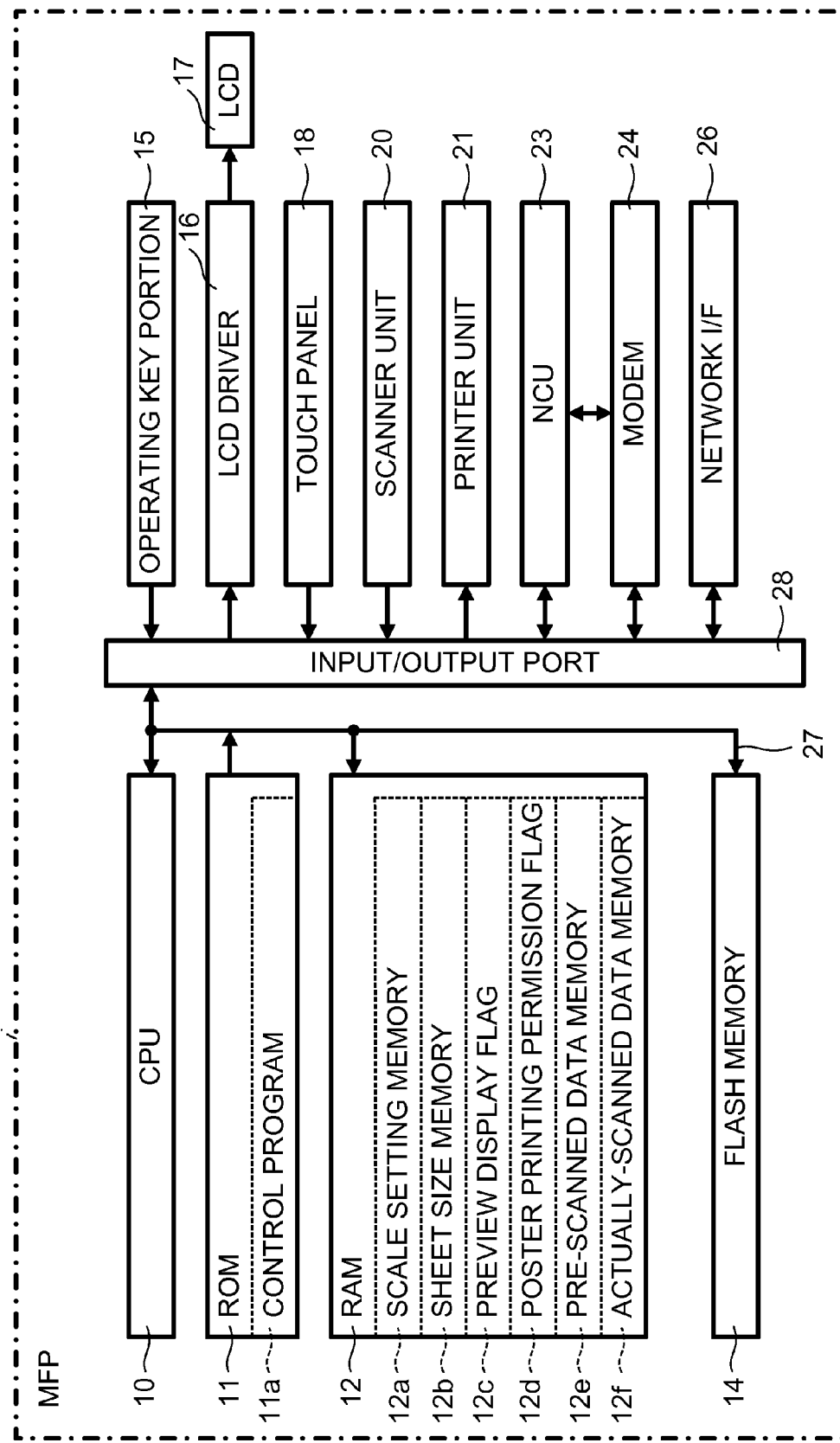
FIG. 1 is a block diagram depicting an electrical configuration of a multifunction peripheral according to an embodiment of the invention.

Embodiments of the invention, and the features and advantages, will be understood with reference to FIGS. 1-4, like numerals being used for corresponding parts in the various drawings.

FIG. 1 is a block diagram depicting an electrical configuration of a multifunction peripheral ("MFP") 1. MFP 1 may perform various functions, e.g., one or more of a copying function, a facsimile function, a scanning function, and a printing function. MFP 1 may comprise a display, e.g., a liquid crystal display ("LCD") 17, configured to display elements, e.g., characters of a target image, which is an image to be formed on a sheet by the execution of copy processing, in substantially the same size as the actual size of the target image formed on the sheet prior to the formation of the target image on the sheet. Thus, MFP 1 may instruct a printer unit 21 to form the enlarged or reduced target image at an appropriate print scale.

The word "size" may be defined as a physical size. Therefore, an image size may be defined as a physical size of an image, e.g., a width and height of an image. Thus, image size may be different from an image resolution, which is measured by a number of pixels.

Referring to FIG. 1, MFP 1 may comprise a central processing unit ("CPU") 10, a read-only memory ("ROM") 11, a random-access memory ("RAM") 12, a flash memory 14, an operating key portion 15, an LCD driver 16, LCD 17, a touch panel 18, a scanner unit 20, printer unit 21, a network control unit ("NCU") 23, a modem 24, and a network interface ("I/F") 26. CPU 10, ROM 11, RAM 12, and flash memory 14 may be connected to each other via a bus line 27. Operating key portion 15, LCD driver 16, touch panel 18, scanner unit 20, printer unit 21, NCU 23, modem 24, network interface 26, and bus line 27 may be connected to each other via an input/output port 28.

CPU 10 may be configured to control various functions of MFP 1 and may control each component connected to input/output port 28, in accordance with fixed values and programs stored in ROM 11 and flash memory 14, data stored in RAM 12, or various signals transmitted or received via NCU 23.

ROM 11 may be a permanent memory storing permanent data that is not to be modified. ROM 11 may store the various programs, e.g., a control program 11a. CPU 10 may perform copy processing in accordance with control program 11a.

RAM 12 may be a volatile rewritable memory that stores data which may be modified. RAM 12 may comprise a scale setting memory 12a, a sheet size memory 12b, a preview display flag 12c, a poster printing permission flag 12d, a pre-scanned data memory 12e, and an actually-scanned data memory 12f. A print scale may be stored in scale setting memory 12a, and a sheet size may be stored in sheet size memory 12b.

Preview display flag 12c may indicate whether a preview window is to be displayed during the copying processing. When preview display flag 12c is on, MFP 1 display may display an element, e.g., a character, of a target image to be formed on a sheet by the copy processing on LCD 17.

Poster printing permission flag 12d may indicate whether a poster printing mode is permitted. In the poster printing mode, a target image is divided into several parts and the divided parts of the target image are formed on different pages of sheets, respectively. When poster printing permission flag 12d is on and a size of a target image to be formed on a sheet is greater than a size of a sheet specified in sheet size memory 12b, MFP 1 may divide the target image into several parts and may form the parts of the target image on different pages of sheets.

Each of pre-scanned data memory 12e and actually-scanned data memory 12f may store image data that is generated by reading a target image by scanner unit 20. Referring to FIG. 2, MFP 1 may display an area including a character of the target image on the preview window by using the image data stored in pre-scanned data memory 12e. Printer unit 21 may form the target image on a sheet by using the image data stored in actually-scanned data memory 12f.

Flash memory 14 may be a nonvolatile rewritable memory and data stored therein may be modified. Operating key portion 15 may include keys through which various instructions may be input into MFP 1. LCD 17 may be driven by LCD driver 16 and may display thereon various images, e.g., the preview window.

Touch panel 18 may be provided on a screen of LCD 17. An entire area of touch panel 18 may be divided into a plurality of sections in grid pattern and an electrostatic sensor may be provided to each divided section of touch panel 18. Touch panel 18 may be configured to input coordinate data to MFP 1. Coordinate data may indicate a position where a user touched on the screen of LCD 17.

Scanner unit 20 may read a target image of a document and may generate image data when the facsimile function, the scanning function, or the copying function is performed. Printer unit 21 may form an image on a sheet when the facsimile function, or the printing function is performed. NCU 23 may control a telephone line. Modem 24 may modulate a transmission signal, such that the transmission signal is suitable for transmission via the telephone line when transmitting facsimile data and demodulates a modulated signal when receiving facsimile data via the telephone line. Network interface 26 may connect MFP 1 with the Internet or a local area network ("LAN").

FIG. 2 depicts an example of a document to be read by scanner unit 20 and an example of the preview window to be displayed on LCD 17, when MFP 1 performs the copy processing. The preview window may comprise a preview area 30, an enlargement key area 31, a reduction key area 32, scrollbars 33, and scroll buttons 34.

MFP 1 may display an area that includes a character of a target image read by scanner unit 20, at substantially the actual size of the read image, e.g., at a display scale of 100%, in preview area 30. When a display resolution of LCD 17, e.g., the number of pixels displayed per unit length, is different from a reading resolution of scanner unit 20, e.g., the number of pixels read per unit length, the resolution of a character of a target image read by scanner unit 21 may be changed, such that the character of the target image may be displayed at substantially the same size as the actual size of the read image. More specifically, when the display resolution of LCD 17 is a factor of "a" times the reading resolution of scanner unit 20 and the number of pixels of the target image read by scanner unit 20 is I×J, e.g., the number of pixels in a width direction is I and the number of pixels in a height direction is J, the number of pixels of the target image may be multiplied by the factor of "a" to create the target image of the number of pixels of Ia×Ja and the created target image may be displayed on LCD 17.

Thus, the character of the target image read by scanner unit 20 may be displayed on LCD 17 at substantially the same size as the actual size of the target image. Depending on the size factor between the resolution of LCD 17 and the resolution of scanner unit 21, a character of a target image read by scanner unit 20 may not be displayed on LCD 17 at its actual size. Thus, substantially the same size may include a size difference not discernible by a user.

An entire area of a target image may be displayed in preview area 30 when the entire area of the target image is less than preview area 30. A display target area may be an area of the target image displayed in preview area 30, e.g., an area enclosed with a double-dotted line in FIG. 2. Scrollbars 33 and scroll buttons 34 may function as operating elements for moving the display target area of the target image. A user may drag scroll buttons 34 in respective scrollbars 33 to move the display target area of the target image in a desired direction.

Enlargement key area 31 and reduction key area 32 may be configured to accept instructions for changing the display scale of a target image displayed in preview area 30. Each time enlargement key area 31 is operated by the user, MFP 1 may enlarge the size of character of a target image displayed in the preview area 30 by percentage factor, e.g., 120%, and may display the enlarged character in preview area 30. Each time reduction key area 32 is operated by the user, MFP 1 may reduce the size of character of the target image displayed in preview area 30 by a percentage factor, e.g., 80%, and may display the size-reduced character of the target image in preview area 30. Accordingly, when the user no longer identify the character displayed in preview area 30 because it is too small, the user may enlarge the displayed character to a desired size by operating enlargement key area 31.

When enlargement key area 31 is operated "n" times and reduction key area 32 is operated "m" times, a display scale in preview area 30 is calculated by a Formula 1 below.

$$\text{Display scale} = 1.2^n \times 0.8^m \times 100.\qquad \text{Formula 1:}$$

As described above, when the original number of pixels of a target image is I×J and the display resolution of LCD 17 is a factor of "a" times the reading resolution of scanner unit 20, the target image having the size Ia×Ja is displayed on LCD 17. Therefore, a character of the target image may be displayed in preview area 30 at a display scale of 100%. Accordingly, with reference to the target image whose resolution has been changed to the number of pixels of Ia×Ja, the target image may be enlarged or reduced based on the display scale obtained by the formula 1 and the enlarged or reduced target image may be displayed on LCD 17. Thus, the character of the target image that is enlarged or reduced at the desired display scale may be displayed on LCD 17.

MFP 1 may specify the print scale of the target image, such that the character displayed in preview area 30 and the character to be formed on a sheet are substantially the same in size. The print scale may be a value indicating a size of a target image to be formed by printer unit 21. The print scale may be indicated by a percentage with 100% being the same size as the target image read by scanner unit 20, e.g., a physical size of width and height. The print scale is calculated by a Formula 2 below.

$$\text{Print scale} = 1.2^n \times 0.8^m \times 100.\qquad \text{Formula 2:}$$

For example, when a character of a target image is displayed in preview area 30 at the display scale of 120% and a size of the target image read by scanner unit 20 is 100%, MFP 1 may instruct printer unit 21 to form the target image that is enlarged at the print scale of substantially 120%.

A user may confirm visually the size of the character of the target image to be formed on a sheet in substantially actual size in preview area 30 prior to the formation of the target image onto the sheet and may specify the appropriate print scale. For example, a user may confirm the size of the character of the target image in preview area 30 and may operate enlargement key area 31 or reduction key area 32 to enlarge or reduce the size of the character displayed in preview area 30 to a desired size. Thus, the user may specify the appropriate print scale. Therefore, an image formation may be prevented from being performed with an inappropriate print setting and unnecessary printing may be minimized.

The display target area that includes a character of a target image may be displayed in preview area 30. Therefore, a user may adjust the print scale, such that the character is large enough to be read by the user by viewing preview area 30. Thus, the user may specify the appropriate print scale readily.

When the print resolution of printer unit 21, e.g., the number of pixels formed per unit length, is a factor of "b" times the reading resolution of scanner unit 20, MFP 1 may allow printer unit 21 to form the target image, on which the resolution change processing and the enlargement or reduction processing have been performed based on the print scale calculated using formula 2. In the resolution change processing, the number of pixels of the target image read by scanner unit 20 may be changed a factor of "b" times. Thus, the width and height of the physical size of the target image read by scanner unit 20 may be enlarged or reduced at the above-described print scale and the enlarged/reduced target image may be printed by printer unit 21.

FIG. 3 depicts a flowchart of a copy processing process performed by CPU 10 of MFP 1. In the copy processing process, a target image of a document placed on a document bed of MFP 1 may be read by scanner unit 20, and the read target image may be formed on a sheet by printer unit 21. MFP 1 may determine a size of a document placed on the document bed by a sensor.

At Step S302, CPU 10 may set various print criteria, e.g., a sheet size, whether to display a preview window or whether to permit a poster printing, based on the user's input. CPU 10 may store a sheet size specified by the user in sheet size memory 12*b*. When the display of the preview window is required by the user, CPU 10 may set preview display flag 12*c* to ON, otherwise preview display flag is set to OFF. When the permission of the poster printing is specified by the user, CPU 10 may set poster printing permission flag 12*d* to ON, otherwise poster printing permission flag 12*d* is set to OFF. A print scale of 100% may be an initial value specified in scale setting memory 12*a*. Alternatively, a print scale specified by the user may be stored in scale setting memory 12*a* at Step S302.

At Step S304, CPU 10 may determine whether preview display flag 12*c* is ON or OFF. If determination at Step 304 is negative, e.g., "No" at Step S304, CPU 10 may determine various parameters, e.g., a reading area, at Step S328. For example, when poster printing permission flag 12*d* is ON and when a document is greater in size than a sheet having the specified size, CPU 10 may specify several reading areas with respect to the target image and may assign page numbers to the respective reading areas, such that CPU 10 may read the target image of the document after dividing the target image into the several reading areas. At Step S330, CPU 10 may instruct scanner unit 20 to read the specified reading areas, e.g., an actual scanning operation. Upon receipt of the instruction from CPU 10, scanner unit 20 may read the specified reading areas, generate image data indicating an image of the read area, and store the image data of the read area in actually-scanned data memory 12*f*.

Next, at Step S332, CPU 10 may instruct printer unit 21 to form the target image by specifying the print scale specified in scale setting memory 12*a*, the sheet size specified in sheet size memory 12*b*, and the image data stored in actually-scanned data memory 12*f*. Printer unit 21 forms the target image on a sheet having the specified size based on the instruction from CPU 10.

At Step S334, CPU 10 may determine whether poster printing permission flag 12*d* is ON. If poster printing permission flag 12*d* is ON, e.g., "Yes" at Step S334, CPU 10 may determine whether all images of the reading areas of the target image specified based on the parameters determined at Step S328 are formed on sheets at Step S336. If the determination of Step S336 is negative, e.g., "No" at Step S336, the process may return to Step S330 and CPU 10 may instruct scanner unit 20 to read another reading area at Step S330.

When CPU 10 determines that all images of the reading areas of the target image are formed after the above steps are repeated, e.g., "Yes" at Step S336, or when CPU 10 determines that poster printing permission flag 12d is OFF, e.g., "No" at Step S334, CPU 10 may terminate the copy processing.

When CPU 10 determines that preview display flag 12c is ON, e.g., "Yes" at Step S304, CPU 10 may instruct scanner unit 20 to read a document, e.g., a pre-scanning operation, at Step S305. Scanner unit 20 may read the target image of the document, generate image data indicating the target image, and store the image data in pre-scanned data memory 12e. At Step S306, CPU 10 may perform optical character recognition ("OCR") processing on the generated image data to detect a character included in the target image.

At Step S308, CPU 10 may determine whether the target image includes plural characters. When the target image is determined to include one or less character, e.g., "No" at Step S308, CPU 10 may display an area including the detected character, e.g., the display target area, in preview area 30 of preview window at Step S316. A print scale of 100% may be specified in scale setting memory 12a as the initial value. Therefore, CPU 10 may display the character of the target image read by scanner unit 20 in preview area 30 in the print scale of 100%, e.g., at substantially the same size as the actual size. In another embodiment, CPU 10 may transmit data for displaying the character of the target image to LCD 17 to be displayed by LCD 17. Thus, when the target image is to be formed on a sheet at the print scale of 100%, a part of the target image, which is substantially the same size as the target image to be formed on a sheet, may be displayed in preview area 30.

When a print scale specified by the user is stored in scale setting memory 12a at Step S302, a character of a target image that is enlarged or reduced at the specified print scale may be displayed in preview area 30.

A part of a target image may be displayed in preview area 30. MFP 1 may create display data, e.g., display image data, indicating an entire target image and display a part of the target image by using the part of the display data. MFP 1 may create display data indicating a display target area of a target image and display a part of the target image by using the display data in preview area 30. In another embodiment, MFP 1 may send, e.g., transmit, the created display data to another display device that may display the target image based on the display data.

When CPU 10 detects plural characters, e.g., "Yes" at Step S308, CPU 10 may display, in preview area 30, a display target area including a smallest character of the detected characters, at Step S310. Therefore, when print scale of 100% is specified in scale setting memory 12a, the smallest character of the characters included in the target image read by scanner unit 20 is displayed at substantially its actual size in preview area 30.

At Step S312, CPU 10 may determine whether the display target area has been changed by the user, e.g., whether scroll buttons 34 have been moved. When a predetermined time has elapsed without scroll buttons 34 being moved, e.g., "No" at Step S312, the process moves to Step S318. When the determination of Step S312 is positive, e.g., "Yes" at Step S312, CPU 10 may change the display target area in accordance with the user's operation, e.g., a display update instruction, and may update the display detail in preview area 30 at Step S314. Thus, the user may select to display an area suitable for determination whether the print scale is desirable, e.g., select to display an important part in the target image, in preview area 30.

At Step S318, CPU 10 may perform setting change processing. In the setting change processing at Step S318, the display scale of the display in preview area 30 may be changed in accordance with the user's operation of enlargement key area 31 or reduction key area 32, or both, and the print scale applied to the target image may be changed.

When the target image is enlarged or reduced at the print scale specified at the setting change processing at Step S318, CPU 10 may determine whether the enlarged or reduced target image fits on one page of a sheet having the size specified in sheet size memory 12b at Step S322. Thus, CPU 10 may determine whether the target image to be formed on one page of a sheet is greater in size than the size of one page of the sheet to be used. When CPU 10 determines that the target image that is enlarged or reduced at the specified print scale is less than the size of one page of the sheet having the size specified in sheet size memory 12b, such that the enlarged or reduced target image fits on one page of the sheet, e.g., "Yes" at Step S322, CPU 10 may determine various parameters, e.g., reading areas, based on the fixed print scale, the sheet size, and the state, e.g., ON or OFF, of poster printing permission flag 12d at Step S328. Then, at Step S332, CPU 10 may instruct printer unit 21 to form the target image by specifying the fixed print scale and the sheet size. Printer unit 21 may form the target image that is enlarged or reduced at the print scale specified by CPU 10 on one page of the sheet having the specified size.

When CPU 10 determines that the enlarged or reduced target image does not fit on one page of the sheet having the size specified in sheet size memory 12b, e.g., "No" at Step S322, CPU 10 may determine whether poster printing permission flag 12 is ON at Step S324. If the determination of Step S324 is negative, e.g., "No" at Step S324, CPU 10 may specify a print area that may be fitted in one page of the sheet having the size specified in sheet size memory 12b, at Step S326. The specified print area may include the area displayed in preview area 30.

CPU 10 may determine various parameters, e.g., reading areas, such that the specified print area is read by scanner unit 20 at Step S328, and may instruct scanner unit 20 to perform the actual scanning operation at Step S330. At Step S332, CPU 10 may create print data, e.g., print image data, based on the image data generated by scanner unit 20 by specifying the fixed print scale and the sheet size. CPU 10 may instruct printer unit 21 to form the target image based on the print data. Thus, CPU 10 may instruct printer unit 21 to form an image of an area of the target image, which includes the area displayed in preview area 30 and which fits in one page of the sheet having the size specified in sheet size memory 12b. Therefore, the user may obtain a print result of the enlarged or reduced target image. The print result may include at least an area displayed in preview area 30.

When poster printing permission flag 12d is ON, e.g., "Yes" at Step S324, CPU 10 may determine various parameters, e.g., reading areas, with respect to the target image at Step S328. Specifically, CPU 10 may specify several reading areas with respect to the target image that is enlarged or reduced at the fixed print scale and may assign page numbers to the respective reading areas such that CPU 10 may print the target image on several pages of sheets having the size specified in sheet size memory 12b after dividing the target image into the several areas. CPU 10 may instruct scanner unit 20 to read the specified reading areas at Step S330 and may instruct printer unit 21 to form the target image read by scanner unit 20 at Step S332. CPU 10 may then perform Step S330 and subsequent steps repeatedly until CPU 10 determines that all images of the reading areas of the target image set based on the parameters determined at Step S328 have been printed, e.g., "Yes" at Step S336.

When CPU 10 determines that the target image that is enlarged or reduced at the specified print scale is greater than the size of the sheet having the size specified in sheet size memory 12*b*, the target image may be divided into several areas and formed on several pages of sheets.

FIG. 4 depicts a flowchart of the setting change processing, e.g., Step S318, performed by CPU 10 of MFP 1. A display detail in preview area 30 may be updated each time enlargement key area 31 or reduction key area 32 in the preview window is operated.

At Step S400, CPU 10 may determine whether enlargement key area 31 or reduction key area 32 has been operated by the user. If the determination at Step S400 is negative, e.g., "No" at Step S400, the process may move to Step S420.

If the determination at Step S400 is positive, e.g., "Yes" at Step S400, CPU 10 may control LCD driver 16 to display enlarged or reduced character of the target image in preview area 30 in accordance with the operation of enlargement key area 31 or reduction key area 32 at Step S401. Specifically, CPU 10 may calculate a display scale by using Formula 1 based on the number of operations of enlargement key area 31 or reduction key area 32 and may display the character of the target image that is enlarged or reduced at the calculated display scale in preview area 30.

At Step S402, CPU 10 may calculate a print scale to be applied to the target image such that the enlarged or reduced character displayed in preview area 30 and the character of the target image to be formed by printer unit 21 have substantially the same size, and may specify the calculated print scale in scale setting memory 12*a*. The print scale may be calculated by using Formula 2 based on the number of operations of enlargement key area 31 or reduction key area 32. In another embodiment, the print scale may be calculated based on the relationship between the number of pixels constituting the character and the display resolution of LCD 17, such that the target image having substantially the same size as the displayed target image may be formed by printer unit 21.

At Step S404, CPU 10 may determine whether the target image, which is enlarged or reduced at the print scale specified in scale setting memory 12*a*, fits on one page of a sheet having the size specified in sheet size memory 12*b*, e.g., being compatible with the specified sheet size. The target image may be determined to fit on one page of the sheet having the specified size when a width of the target image is less than a width of the sheet having the specified size and a height of the target image is less than a height of the sheet having the specified size. If the determination of Step S404 is positive, e.g., "Yes" at Step S404, CPU 10 may determine whether an instruction to fix the print scale has been input by the user at Step S420. Specifically, CPU 10 may determine whether an enter key, which is provided in operating key portion 15, has been pressed. If the determination of Step S420 is positive, e.g., "Yes" at Step S420, CPU 10 may fix the print scale, which has been specified in scale setting memory 12*a*, to be applied to the target image, and the process may move to Step S322. If the determination of Step S420 is negative, e.g., "No" at Step S420, the process may return to Step S400, and CPU 10 may perform Step S400 and the subsequent steps.

If the determination of Step S404 is negative, e.g., "No" at Step S404, CPU 10 may display, on LCD 17, a message indicating that: "The target image cannot fit on one page" to notify the user at Step S406.

In another embodiment, CPU 10 may issue an audible message to notify the user. Thus, the user may determine whether the current print scale is appropriate based on the message. For example, if the user would like to fit the target image on one page of a sheet, the user may take appropriate action by operating reduction key area 32 to scale down the target image. Accordingly, the user may readily specify the desired print scale.

At Step S408, CPU 10 may determine whether there is another tray, in which a sheet that is greater than the size of the sheet having the size specified in sheet size memory 12*b*, is disposed in the MFP 1. MFP 1 may comprise a plurality of sheet trays and may prestore sizes of sheets loaded in the respective sheet trays.

If the determination of Step S408 is negative, e.g., "No" at Step S408, the process may move to Step S420. If there is a sheet tray on which a sheet having a size that is larger than the sheet having the size specified in the sheet size memory 12*b*, e.g., "Yes" at Step S408, CPU 10 may display a message indicating that: "Selecting another tray is recommended," on LCD 17 and may accept the changing of the sheet size specified, at Step S410.

At Step S412, CPU 10 may determine whether the sheet size has been changed by the user. The user may instruct MFP 1 to change the sheet size through a numeric key pad provided in operating key portion 15. If the sheet size change was not instructed by the user although a predetermined time has elapsed, e.g., "No" at Step S412, the process may move to Step S420. If the sheet size has been changed by the user, e.g., "Yes" at Step S412, CPU 10 may set the sheet size newly specified by the user, in sheet size memory 12*b*, at Step S414. Accordingly, the user may specify again an appropriate sheet size, for example, a sheet size that is greater than the size of the target image that is enlarged or reduced at the print scale specified in scale setting memory 12*a*, as a size of a sheet on which the target image is to be formed. In the setting change processing according, the sheet size is specified again if CPU 10 again determines that the size of the target image is greater than the specified sheet size.

At Step S416, CPU 10 may determine whether the target image that is enlarged or reduced at the print scale specified in scale setting memory 12*a* fits on one page of the sheet having the size newly specified. If CPU 10 determines that the target image that is enlarged or reduced at the specified print scale is greater than the size of the sheet having the size newly specified and the target image cannot fit on one page of the sheet, e.g., "No" at Step S416, CPU 10 may display a message indicating that: "The target image cannot fit on one page," on LCD 17 and may notify the user, at Step S418, and the process may move to Step S420. If CPU 10 determines that the target image that is enlarged or reduced at the specified print scale is less than the size of the sheet having the size newly specified and the target image fits on one page of the sheet, e.g., "Yes" at Step S416, the process may skip Step S418 and move to Step S420.

According to the setting change processing, the user performs operations to display the character of the target image with enlarged or reduced while viewing the character of the target image displayed in preview area 30. Thus, the user readily may specify an appropriate print scale.

In another embodiment of the invention, the image processing device may configured to provide an instruction for image formation to an image forming portion that is externally provided, e.g., a personal computer, a scanner, a cellular phone, or a digital camera.

In the embodiment described above, the display target area including the smallest character of the target image may be displayed in preview area 30 first. In another embodiment, a display target area including a title may be displayed first in preview area 30.

In the embodiment described above, the invention may be applied to the setting of the print scale during the copy processing. In another embodiment, based on data received by the facsimile function, elements, e.g., characters, of a target image to be formed by the image forming portion, the target image may be displayed in substantially actual size prior to the formation of the target image. The image indicated by the data received by the facsimile function may correspond to an example of the target image. Further, the image to be formed by the image forming portion may be based on data read from a media card attached to a card slot or based on data input through an external personal computer.

In another embodiment, a personal computer may function as an image processing device, and the total number of pixels displayed on a monitor of the personal computer and a physical width and height of the monitor may be obtained. Thus, an actual size of elements of a target image may be obtained by using the obtained total number of pixels and the physical width and height of the monitor, and the print scale may be specified by using the obtained actual size of the elements of the target image.

In the embodiment described above, MFP 1 may include LCD 17. In another embodiment, LCD 17 may be provided with another device and MFP 1 may transmit display data to LCD 17 of the another device to display the target image.

In the embodiment describe above, MFP 1 may include printer unit 21. In another embodiment printer unit 21 may be provided in another device and MFP 1 may transmit print data to printer unit 21 of the another device to print the target image.

In the embodiment described above, the display target area of the target image may be displayed in preview area 30. In another embodiment, one or more characters of the target image may be sampled by the optical character recognition ("OCR") processing, and the sampled characters may be displayed on the display portion.

In the embodiment described above, the print scale may be obtained by calculation using a formula. Alternatively, a table, in which a corresponding relationship between the number of operations of enlargement key area 31 or reduction key area 32 and the print scales are specified, may be prepared in advance, and a print scale may be read and specified in accordance the number of operations with reference to the table.

In the embodiment described above, the initial display scale in the preview window may be 100%. Thus, an element of a target image read by scanner unit 20 may be displayed initially in substantially its actual size in the preview window. In another embodiment, the initial display scale may be specified, such that an entire area of a target image or an entire length of the target image in a width direction or in a height direction may be displayed in the preview window initially. Thus, the user may confirm the entire target image through the first preview image.

In yet another embodiment, an element of a target image to be formed on one page of a sheet at substantially its actual size may be displayed in the preview window initially when the target image is enlarged or reduced at a print scale automatically calculated based on the size of the sheet to be used. For example, when a target image has a size that is different from an A4-size sheet while the A4 size is specified for formation of the target image, a print scale may be calculated to form the target image that fits on one page of the A4-size sheet, and the initial display scale may be specified, such that an element of the target image that is enlarged or reduced at the calculated print scale may be displayed at substantially its actual size in the preview window.

In the embodiment described above, the initial value of the print scale may be set to 100% by default. In another embodiment, when the user specifies the print scale, an element of a target image that is enlarged or reduced at the specified print scale may be displayed in substantially actual size first in the preview window.

When the initial display scale in the preview window is not set to 100%, the print scale may be calculated by a Formula 3 below, $$\text{Print scale} = 1.2''\times 0.8'''\times c \quad \text{Formula 3:}$$

The "c" indicates an initial print scale in the preview window.

In the embodiment described above, each time the display scale is changed, the print scale may be calculated and CPU 10 may determine whether a target image that is enlarged or reduced at the calculated print scale fits on one page of a sheet. In another embodiment, CPU 10 may determine the relationship between the sheet size and the target image size at a predetermined timing, e.g., when the print scale is fixed, or when the implementation of the copy processing is instructed.

In the embodiment described above, a character of a target image may be an example of an element. In another embodiment, the element may be, for example, symbols, marks, pictures, or illustrations.

In the embodiment described above, the various functions may be performed by CPU 10. In another embodiment, the various functions may be performed by another processor, e.g., an Application Specific Integrated Circuit ("ASIC") or a logical circuit.

While the invention has been described in detail with reference to the specific embodiment thereof, it would be apparent to those skilled in the art that various changes, arrangements and modifications may be applied therein without departing from the spirit and scope of the invention.

While the invention has been described connection with various exemplary structures and illustrative embodiments, it will be understood by those skilled in the art that other variations and modifications of the structures and embodiments describes above may be made without departing from the scope of the invention. Other structures and embodiments will be apparent to those skilled in the art from a construction of the specification or practice of the invention disclosed herein. It is intended that the specification and described examples are illustrative with the true scope of the invention being defined by the following claims.

What is claimed is:

1. An image processing device that transmits print image data to an image forming portion to form a target image on at least one recording medium, comprising:
a processor; and
a non-transitory, computer-readable medium storing computer-readable instructions that, when executed by the processor, cause the image processing device to perform steps, comprising:
receiving image data for forming the target image on the at least one recording medium;
generating display image data from the image data at a display scale for displaying the target image including an element of the target image on a display portion prior to formation of the target image on the at least one recording medium;
generating print image data from the image data at a print scale for forming the target image on the at least one recording medium, such that the element of the target image to be formed on the at least one recording medium has substantially the same size as the element of the target image displayed on the display portion;

transmitting the display image data to the display portion;

specifying a size of the at least one recording medium on which the target image is to be formed by the image forming portion;

determining whether the target image to be printed on the at least one recording medium is compatible with the specified size of the at least one recording medium; and issuing a notification when the target image to be printed on the at least one recording medium is greater in size than the specified size of the at least one recording medium.

2. The image processing device according to claim 1 further comprising:

an instruction receiving portion configured to receive an instruction to enlarge or reduce the display scale of the display image data, such that the element of the target image displayed on the display portion is enlarged or reduced based on the instruction, wherein the print scale of the print image data is enlarged or reduced based on the enlarged or reduced display scale, such that the enlarged or reduced element of the target image displayed on the display portion and the element of the target image to be formed on the at least one recording medium have substantially the same size.

3. The image processing device according to claim 1, wherein the step of determining whether the target image to be printed on the at least one recording medium is compatible with the specified size of the at least one recording medium is performed when the display scale is enlarged or reduced.

4. The image processing device according to claim 1, wherein, when the target image to be printed on the at least one recording medium is determined not to be compatible with the specified size of the at least one recording medium, a recording medium having a larger size than the size of the at least one recording medium is specified as a size of the at least one recording medium on which the target image is to be formed.

5. The image processing device according to claim 1, the steps further comprise: when the target image to be formed on the at least one recording medium is determined not to be compatible with the specified size of the at least one recording medium, generating the display image data including an area of the target image that fits on one page of the at least one recording medium having the specified size, wherein the area of the target image includes the element of the target image displayed on the display portion.

6. The image processing device according to claim 1, wherein the steps further comprise: when the size of the target image to be formed on the at least one recording medium is determined not to be compatible with the specified size of the at least one recording medium, dividing the image data or the print image data, such that the target image is formed on a plurality of the at least one recording media.

7. The image processing device according to claim 1, wherein the steps further comprise detecting a character included in the target image, and generating the display image data including the detected character of the image data, such that an area of the target image including the detected character is displayed on the display portion as the element of the target image.

8. The image processing device according to claim 6, wherein, when a plurality of characters are detected, generating the display image data, such that an area including a smallest character of the detected characters is displayed on the display portion.

9. The image processing device according to claim 6, wherein the steps further comprise updating the display image data, such that an area of the target image displayed on the display portion is updated in accordance with a display update instruction.

10. The image processing device according to claim 1, wherein the image processing device further comprises the display portion that displays the target image to be formed on the at least one recording medium.

11. The image processing device according to claim 1, wherein the image processing device further comprises the image forming portion configured to form the target image on the at least one recording medium.

12. The image processing device according to claim 1, wherein the processor comprises at least one or more of a CPU, an Application Specific Integrated Circuit, and a logical circuit.

13. A non-transitory, computer-readable medium storing an image processing program that, when executed by a processor, causes an image processing device to execute steps comprising:

receiving image data for forming a target image on at least one recording medium;

generating display image data from the image data at a display scale for displaying the target image including an element of the target image on a display portion prior to formation of the target image on the at least one recording medium;

generating print image data from the image data at a print scale for forming the target image on the at least one recording medium, such that the element of the target image to be formed on the at least one recording medium has substantially the same size as the element of the target image displayed on the display portion; and transmitting the display image data to the display portion;

specifying a size of the at least one recording medium on which the target image is to be formed by an image forming portion;

determining whether the target image to be printed on the at least one recording medium is compatible with the specified size of the at least one recording medium; and issuing a notification when the target image to be printed on the at least one recording medium is greater in size than the specified size of the at least one recording medium.

14. A method for processing image data to from a target image on at least one recording medium, the method comprising steps of:

receiving the image data for forming the target image on the at least one recording medium;

generating display image data from the image data based on a display scale for displaying an element of the target image on a display portion prior to the formation of the target image on the at least one recording medium;

generating print image data for forming the target image on the at least one recording medium, such that the element to be formed on the at least one recording medium has substantially the same size as the element displayed on the display portion; and transmitting the display image data to the display portion;

specifying a size of the at least one recording medium on which the target image is to be formed by an image forming portion;

determining whether the target image to be printed on the at least one recording medium is compatible with the specified size of the at least one recording medium; and issuing a notification when the target image to be printed on the at least one recording medium is greater in size than the specified size of the at least one recording medium.

* * * * *